Figure 1:
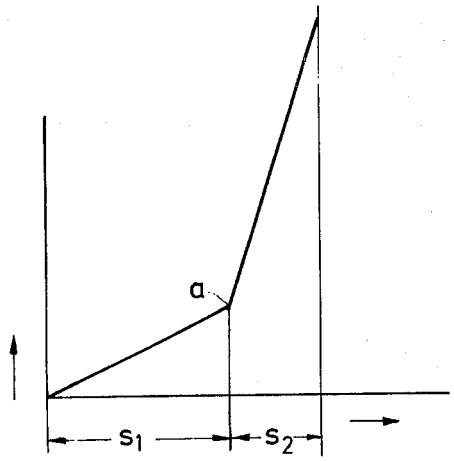

# United States Patent [19]
Liebich

[11] 3,905,459
[45] Sept. 16, 1975

[54] HYDRAULICALLY ACTUATED PLATE CLUTCH WITH ACCUMULATOR

[75] Inventor: Rudolf Liebich, Klein-Berkel, Germany

[73] Assignee: Eisenwerke Reintjes GmbH, Hameln, Germany

[22] Filed: Sept. 13, 1973

[21] Appl. No.: 396,712

[30] Foreign Application Priority Data
Sept. 13, 1972  Germany............................ 2244919

[52] U.S. Cl. ............................... 192/109 F; 138/30
[51] Int. Cl.² ........................................... F16D 25/00
[58] Field of Search......................... 192/109 F, 85 R

[56] References Cited
UNITED STATES PATENTS

| | | | |
|---|---|---|---|
| 2,614,396 | 10/1952 | Raterman | 192/109 F |
| 2,722,296 | 11/1955 | Stoeckicht | 192/109 F |
| 2,756,851 | 7/1956 | Collins | 192/109 F |
| 3,541,791 | 11/1970 | Lvovsky et al. | 192/87.18 X |
| 3,583,422 | 6/1971 | Dach | 192/109 F |
| 3,703,228 | 11/1972 | Chana | 192/109 F |

*Primary Examiner*—Benjamin W. Wyche
*Attorney, Agent, or Firm*—Dressler, Goldsmith, Clement & Gordon, Ltd.

[57] ABSTRACT

The clutch control system described herein includes control mechanisms including a hydropneumatic accumulator, so that upon the introduction of pressure to actuate the clutch, the engagement takes place initially at a rapid rate, until the clutch begins to engage, and thereafter at a slower rate, until the clutch completely engages. This includes a spring-biased piston accumulator arrangement.

3 Claims, 3 Drawing Figures

HYDRAULICALLY ACTUATED PLATE CLUTCH WITH ACCUMULATOR

The invention relates to a hydraulically actuated piston unit which is optionally connectable via a control valve to a delivery duct or to a return duct, respectively.

Oil pressure controlled plate clutches, which operate with a high contact pressure, perform the clutch engagement operation in fractions of a second. This is accompanied by the brief appearance of a high engagement torque which may amount to a multiple of the normal torque.

Hydraulically actuated plate clutches of this kind are used in the main propulsion plants of ships together with ship diesel engines of medium speed (approximately 400 to 900 revolutions per minute) and for reversing drives. When the ship's reversing drive is changed over, the high engagement torque resulting from the very brief engagement time of the plate clutch may cause stalling of the engine and even reversal of the engine in the opposite direction of rotation. The engine is therefore at risk. Moreover, this also results in a hazard for the navigation of the vessel. A similar risk also occurs in other positions in which oil pressure controlled plate clutches are used.

It is therefore the object of the invention to construct hydraulically actuated plate clutches with a high contact pressure in such a way that engagement takes place initially rapidly until the clutch begins to bite and thereafter slowly until the clutch is completely engaged.

In a hydraulically actuated plate clutch of the kind described hereinbefore this problem is solved in accordance with the invention in that the piston unit is associated with a spring accumulator device which is charged during the engagement stroke of the piston and that a vessel which functions as hydropneumatic accumulator is connected via an adjustable non-return valve into the feed duct between the control valve and the piston unit. The use of the spring storage device progressively prestresses the hydraulic fluid which is supplied to the piston unit via the feed duct. If the prestressed pressure exceeds the pressure that acts on the non-return valve, the latter will open and part of the hydraulic fluid which is fed by a hydraulic fluid pump into the feed duct is transferred via the non-return valve into the hydropneumatic accumulator. The piston unit of the plate clutch is supplied with only part of the hydraulic fluid so that its motion takes place more slowly after the non-return valve has opened. When the pressure built up in the vessel which functions as the hydropneumatic accumulator corresponds to that of the prestress which is applied by the spring storage device on the piston unit the engagement stroke of the piston will be terminated and the clutch engagement will be completed. The delay for only part of the engagement motion increases the engagement time as little as possible but nevertheless ensures smooth and gradual clutch engagement which is not subject to excessive engagement torques. Engine stalling or even reversal of the engine into the other direction of rotation is thus reliably prevented. The device is nevertheless of very simple construction and can be provided without difficulties and at low cost on plate clutches for reversing drives and the like and may also be subsequently incorporated therein.

The spring storage device is appropriately constructed of return springs which act on the piston unit. This provides a particularly simple embodiment.

Different adjusting means may be provided in order to adjust or influence the engagement characteristics of the plate clutch in the desired manner. For example, the prestress of the non-return valve may be made adjustable. By these means it is possible to influence the distance which the piston unit traverses rapidly at the beginning of the engagement: the higher the prestress of the non-return valve, the later will it open and open the connection to the vessel which functions as hydropneumatic accumulator and thus decelerate the motion of the piston unit. As the prestress of the non-return valve increases the stroke of the piston unit which traverses rapidly at the beginning of the engagement, operation will also become longer, and vice versa. Spring characteristics and spring stress of the spring accumulator may also be adjustable. The pressure rise in the feed duct and therefore the operation of the device which gives protection against excessive engagement torques may thus also be regulated in a simple manner.

The size of the vessel which functions as hydropneumatic accumulator is appropriately selected in accordance with the desired clutch engagement characteristics. To this end the size of the vessel defines the buildup of reaction pressure against the prestress applied by the spring accumulator so that the clutch engagement speed in the second, decelerated part of the piston unit motion can be brought to a desired value. The vessel can be connected to the feed duct between the piston unit and the control valve for the purpose of discharging via an un-prestressed non-return valve. While the feed duct communicates with the hydraulic fluid pump the aforementioned non-return valve is kept closed by the pressure which prevails in the feed duct.

However, if the control valve changes over from the delivery duct to the return duct and thus reduces the pressure the non-return valve will open automatically and empty the vessel. This ensures in a simple manner that the device is functional for the next engagement operation.

Figure 2:
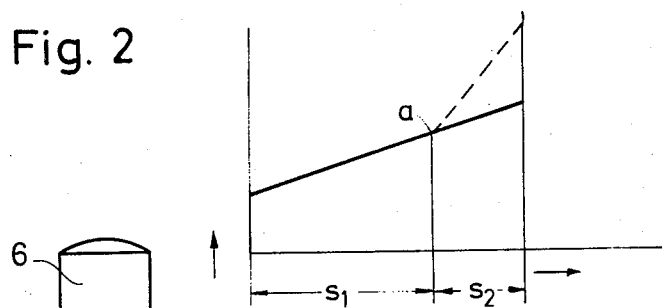
Figure 3:
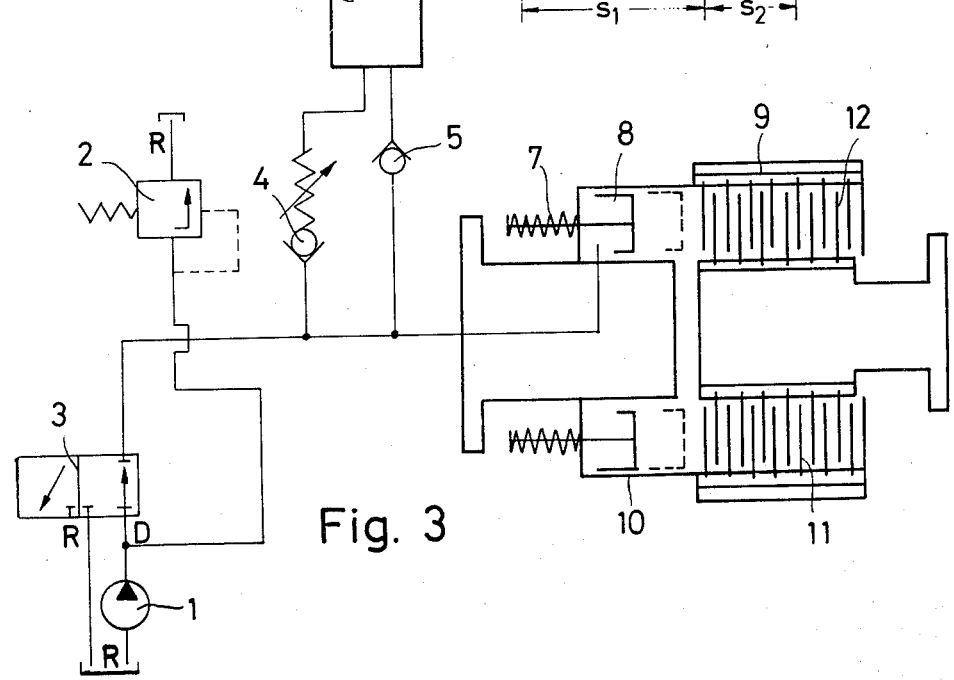

Further details, advantages and features of the invention are disclosed in the description hereinbelow. The drawing illustrates the invention in exemplified form and shows in:

FIG. 1 the relationship between the length of stroke and the time required for a specific piston travel in diagrammatic form in a graph;

FIG. 2 shows the relationship between the force of the return spring and the stroke of the piston unit in a diagrammatic graph; and FIG. 3 shows one embodiment of the invention in diagrammatic form.

FIG. 1 shows that the total travel of the piston unit required for clutch engagement is divided into two travels $s_1$ and $s_2$. This proceeds from the fact that reversal of the ship's reversing drive is to take place in a relatively short reversal time, although engagement of the plate clutch is to proceed smoothly and slowly. The travel $s_1$, as far as the position $a$, is therefore traversed rapidly, but the travel $s_2$ is traversed more slowly from position $a$. This may be recognized by virtue of the fact that the straight line which illustrates the relationship between time and length of stroke has a steeper angle, i.e., a longer time is required to traverse a specific length of stroke after the position $a$. It follows that the piston unit of the plate clutch compresses the plates sensitively over the travel $s_2$.

FIG. 2 shows a relationship between the force of the return spring and the stroke of the piston unit. A solid straight line on which the position $a$ (see FIG. 1) is disposed is obtained in view of the known linear relationship between spring force and spring deformation: The force applied by the return spring is, of course, unaffected by the velocity of the piston unit motion. However, when using a plate clutch with corrugated internal plates (so-called sine plates), the displacements are arranged so that the deformation of the sine plates begins at position $a$ and the return force applied by the return spring will be superimposed on the return force due to the sine plates, as indicated in broken lines in FIG. 2.

FIG. 3 shows a hydraulic pump 1 which draws hydraulic fluid from a tank or from a return duct R and feeds it into a delivery duct D. A conventional pressure relief valve 2 and a control valve 3 are connected to the delivery duct, the control valve 3 being adapted for optional manual operation, remote control, automatic, or some other suitable mode of operation.

When the control valve 3 is in one position, the hydraulic fluid pump 1, or the delivery duct D is connected to the feed duct of the piston unit of the plate clutch. As shown by the illustration, a vessel 6 is connected to the aforementioned feed duct between the control valve 3 and the piston unit via an adjustably prestressed non-return valve 4 and an unstressed non-return valve 5. The vessel 6 contains a defined air or gas volume, so that the entry of fluid into the container 6 causes a gradual rise of the pressure in the said container which represents a hydropneumatic accumulator, the increase following a hyperbolic characteristic.

Return springs 7 maintain the piston unit 8 of the plate clutch 9 in its inoperative position, which corresponds to the disengaged position. To this end, the piston unit 8 bears in its cylinder 10 on a cylinder base into which a feed duct extends which is connected to the delivery side of the hydraulic pump 1 when the control valve 3 is in the illustrated position. The illustration also shows the position of the parts immediately after the control valve 3 is moved into the aforementioned position.

The plate clutch 9 is also provided with external plates 11, which are coupled to the output shaft of the engine, and is provided with internal plates 12, which are disposed on the outward shaft of the plate clutch 9. The internal plates 12 may be constructed as sine plates.

The device according to FIG. 3 operates as follows:

When the control valve 3 is switched on, the hydraulic fluid delivered by the hydraulic pump 1 flows behind the piston unit 8 of the plate clutch 9. The piston unit 8 is thus rapidly displaced to the right in its cylinder 10 over the travel $s_1$, while the spring accumulator comprising the return springs 7, a corresponding hydraulic device, or the like, is charged. The return springs 7 are thus stressed and produce a reaction pressure in the entire hydraulic system. At the end of the travel $s_1$, the said reaction pressure becomes so large that the prestressed non-return valve 4 opens and part of the hydraulic fluid delivered by the hydraulic pump 1 flows not to the cylinder 10 of the piston unit 8, but into the vessel 6. The division of the hydraulic fluid results in a slower forward motion of the piston unit 8 over the distance $s_2$.

The gas volume in the vessel 6 is compressed by the fluid which flows into the vessel so that the pressure in the vessel 6 gradually rises, while the piston unit 8 travels over the distance $s_2$. The vessel 6 therefore functions as an accumulator for the hydraulic system. The magnitude of the vessel 6 defines the forward velocity and the rate of pressure buildup in the course of the piston unit 8 traversing over the distance $s_2$.

By regulating the prestress of the non-return valve 4, it is possible to influence the length of the distance $s_1$. If sine plates are used as internal plates 12 in the plate clutch 9, the distance $s_1$ will be appropriately adjusted, so that the sine plates are compressed while the distance $s_2$ is traversed. This results in particularly sensitive engagement. However, owing to the slow advance of the piston unit 8, while traversing over the distance $s_2$, this results in a longer period of time for slip of the plate clutch and therefore results in a reduced engagement torque. Dividing the distance which has to be traversed therefore effectively combines rapid operation with the least possible engagement torque.

If the control valve 3 is displaced from the position shown in FIG. 3 to the right, the feed duct of the piston unit 8 or of its cylinder 10 will be isolated from the hydraulic pump 1. The return springs 7 will then pull the piston unit 8 into its initial position shown in FIG. 3, while the hydraulic fluid is discharged. The vessel 6 is simultaneously emptied via the nonreturn valve 5. The hydraulic pump 1 returns fluid into the reservoir or return duct via the pressure relief valve 2.

I claim:

1. Control means for hydraulically actuating a plate clutch having at least one first clutch plate and at least one second clutch plate and a piston means for moving said first plate in a first direction into engagement with said second plate, said control means comprising:

means under stress and operatively connected to said piston means for resiliently biasing said piston means in a second direction opposite to said first direction and for normally holding said first plate out of engagement with said second plate, whereby when said piston means moves in said first direction said biasing means becomes increasingly stressed, a source of fluid, first conduit means in fluid communication with said piston means for transmitting fluid under pressure from said source to said piston means to move said piston means in said first direction, thereby increasingly to stress said biasing means, a pump in said first conduit means between said source and said piston means for supplying fluid under pressure to said piston means, first valve means in said first conduit means for interconnecting said pump with said piston means through said first conduit means in a first position of said first valve means and bypassing said pump and interconnecting said piston means with said source in a second position of said first valve means, a fluid accumulator, second conduit means for selectively interconnecting said accumulator with said first conduit means, automatically openable second valve means disposed in said second conduit means, means biasing said second valve means to remain in a closed condition until after said piston means have moved a preselected distance in said first direction and said means resiliently biasing said piston means has thereby become stressed a preselected amount, said second valve means being responsive to pressure build up resulting from stressing said means biasing said piston means to only then place said accumulator in communication with said first conduit means to receive part of the fluid which would otherwise by transmitted to said piston means, thereby to decrease the rate of movement of said piston means in said first direction, third conduit means connected between said accumulator and said first conduit means, one way valve means in said third conduit means, fluid pressure in the portion of said third conduit means between said one way valve means and said first conduit means maintaining said one way valve means closed while said first control valve means is in said first position and until said first control valve means is moved to said second position at which time fluid pressure in the portion of said third conduit means between said accumulator and said one way valve means exceeds the fluid pressure in the portion of said third conduit means between said first conduit means and said accumulator at which time said one way valve means opens and said accumulator discharges fluid into said first conduit means for flow of fluid to said source, whereby said piston means moves at a first faster rate during the first portion of its movement in said first direction and at a second slower rate during the second portion of its movement in said first direction after said second valve means has opened to establish communication with said accumulator.

2. Clutch control means as set forth in claim 1 in which the means for resiliently biasing said piston means includes spring means.

3. Clutch control means in accordance with claim 1 in which the setting of said second valve is adjustable.

* * * * *